United States Patent
Van Den Aker et al.

(10) Patent No.: US 10,485,376 B2
(45) Date of Patent: Nov. 26, 2019

(54) SET OF CONSUMABLES AND BEVERAGE DISPENSER

(71) Applicant: KONINKLIJKE PHILIPS N.V., Eindhoven (NL)

(72) Inventors: Karel Johannes Adrianus Van Den Aker, Eindhoven (NL); Franciscus Johannes Gerardus Hakkens, Eindhoven (NL); Jan Frederik Suijver, Eindhoven (NL); Jasper De Vreede, Eindhoven (NL); Christoph Dobrusskin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 73 days.

(21) Appl. No.: 15/102,279

(22) PCT Filed: Dec. 10, 2014

(86) PCT No.: PCT/EP2014/077097
§ 371 (c)(1),
(2) Date: Jun. 7, 2016

(87) PCT Pub. No.: WO2015/091116
PCT Pub. Date: Jun. 25, 2015

(65) Prior Publication Data
US 2016/0309952 A1    Oct. 27, 2016

(30) Foreign Application Priority Data

Dec. 20, 2013   (EP) .................................... 13199176

(51) Int. Cl.
*A47J 31/44*   (2006.01)
*A47J 31/36*   (2006.01)
*A47J 31/52*   (2006.01)

(52) U.S. Cl.
CPC ....... *A47J 31/4492* (2013.01); *A47J 31/3623* (2013.01); *A47J 31/3642* (2013.01); *A47J 31/52* (2013.01); *A47J 31/3695* (2013.01)

(58) Field of Classification Search
CPC .. A47J 31/3628; A47J 31/3695; A47J 31/368; A47J 31/3623
(Continued)

(56) References Cited

U.S. PATENT DOCUMENTS 9,585,511 B2 * 3/2017 Koeling ................ A47J 31/407
2005/0183578 A1   8/2005 Mandralis
(Continued)

FOREIGN PATENT DOCUMENTS

CN    1842289 A    10/2006
CN   102458149 A    5/2012
(Continued)

OTHER PUBLICATIONS

Office Action issued in connection with corresponding 14815613.6, dated Feb. 22, 2017, 4 pages.
(Continued)

*Primary Examiner* — Reginald Alexander
(74) *Attorney, Agent, or Firm* — Schott, P.C.

(57) ABSTRACT

At least two consumables of a set for use in a beverage dispenser wherein each consumable includes a filtering body defining a space containing a food substance, from which the beverage is obtained by use of liquid, and a recognition element representing a surface of the filtering body configured to face a plurality of nozzles of the beverage dispenser that provide a flow of liquid through the consumable. The recognition element has a mechanical property, which is recognizable and/or interpretable by the beverage dispenser when said beverage dispenser obtains a sensor signal by sensing a flow characteristic of the flow of liquid, when the
(Continued)

flow of liquid through the consumable is started by the plurality of nozzles. Said mechanical property is different for each type of consumable of the set of consumables so that a characteristic of said sensor signal depends on the mechanical property of the recognition element.

13 Claims, 5 Drawing Sheets

(58) Field of Classification Search
USPC .............................................. 99/295, 289 R
See application file for complete search history.

(56) References Cited

U.S. PATENT DOCUMENTS

| | | | | |
|---|---|---|---|---|
| 2005/0223904 | A1* | 10/2005 | Laigneau | A47J 31/0647 |
| | | | | 99/295 |
| 2012/0031279 | A1* | 2/2012 | Mariller | A47J 31/3695 |
| | | | | 99/295 |
| 2013/0129872 | A1 | 5/2013 | Kruger | |
| 2013/0167733 | A1* | 7/2013 | Mahlich | A47J 31/3633 |
| | | | | 99/295 |
| 2014/0026761 | A1* | 1/2014 | Bartoli | A47J 31/0668 |
| | | | | 99/295 |

FOREIGN PATENT DOCUMENTS

| | | |
|---|---|---|
| CN | 102665500 A | 9/2012 |
| CN | 102740746 A | 10/2012 |
| CN | 103096767 A | 5/2013 |
| DE | 202006014317 U1 | 2/2008 |
| EP | 1839541 A1 | 10/2007 |
| EP | 2345351 A1 | 7/2011 |
| JP | 2005-230548 A | 9/2005 |
| JP | 2013-530798 A | 8/2013 |
| WO | 2005053485 A1 | 6/2005 |
| WO | 2008114210 A1 | 9/2008 |
| WO | 2011116247 A2 | 9/2011 |
| WO | 201200878 A2 | 1/2012 |
| WO | 2012123440 A1 | 9/2012 |
| WO | 2013046149 A1 | 4/2013 |
| WO | 2013080073 A1 | 6/2013 |

OTHER PUBLICATIONS

Office Action issued in connection with corresponding 201480069970.5, dated Jun. 11, 2018, 22 pages.
Office Action issued in connection with corresponding 2016-539941, dated Oct. 18, 2018, 14 pages.
Office Action issued in connection with corresponding 201480069970.5, dated Mar. 1, 2019, 8 pages.

* cited by examiner

SET OF CONSUMABLES AND BEVERAGE DISPENSER

This application is the U.S. National Phase application under 35 U.S.C. § 371 of International Application No. PCT/EP2014/077097, filed on Dec. 10, 2014, which claims the benefit of International Application No. 13199176.2 filed on Dec. 20, 2013. These applications are hereby incorporated by reference herein.

FIELD OF THE INVENTION

The present invention relates to a set of consumables comprising at least two consumables for use in a beverage dispenser for preparation of a beverage. The present invention relates further to a beverage dispenser for preparation of a beverage by use of a consumable containing a food substance, from which the beverage is obtained by use of a liquid, and to a beverage preparation system for preparation of a beverage.

BACKGROUND OF THE INVENTION

The invention relates to the area of appliances (generally referred to as beverage dispensers herein) that prepare a beverage via extraction of food substances through the passage of an extraction fluid, such as hot or cold water, under pressure. The food substance, such as coffee or tea, is contained in consumables that are inserted in these appliances. A beverage may thus generally be coffee, tea, soup, hot or cold chocolate, milk or baby food. Such a beverage making device is e.g. disclosed in WO 2005/053485 A1. Said beverage making device comprises a brewing chamber (hereinafter also called "chamber") for enclosing one or more pads containing a substance from which the beverage is to be brewed, means for supplying water to said brewing chamber, and means for conducting the brewed beverage from the brewing chamber.

More and more types and flavors of these beverages are introduced which creates a new opportunity for innovation. When the type of beverage or ingredient is recognized the appliance can automatically optimize the brewing parameters including one or more of time, temperature, pressure, flow and cup volume to the consumable offered to the appliance. Such a system for the production of beverages is e.g. disclosed in WO 2013/046149 A1, which system comprises a beverage dispenser and a pod to be inserted in the beverage dispenser for the passage of the liquid (sometimes also referred to as extraction liquid) of the beverage. The pod includes a filtering body (also referred to as substance containing body) which defines a space that contains the food substance from which the beverage is obtained. The filtering body has on the outside a flange. There is a recognition element associated to the filtering body which can be recognized and/or interpreted by a recognition device of the beverage dispenser.

The consumables (also called single-serve units) currently in use are basically of two types. One type of consumable is generally called a "capsule" and is basically a unit with rigid walls containing the food substance and that has two bases through which the extraction water passes. The capsules are placed into chambers defined by two bodies, one shaped to receive most of the capsule and a closing body which tightly seals the chamber. The water is introduced into the chamber and then traverses the capsule. Thanks to the rigid shape of the capsule, the hydraulic seals of the chamber allow the water to basically traverse the capsule without recirculating the extracted substance through the chamber.

A second type of consumable of a flat shape, is generally called a "pod" (or "pad") and consists of two sections made of thin soft material, pierced, paired in order to define a cavity in which the food substance is placed. The material may be for example paper, or a cloth or a non-woven fabric with filtering properties. The two sections are generally circular and are coupled along their outer edges, defining an outer annular flange. The machines which use pods have two half-shells which are sealed to define a chamber where the pod is placed. Specifically, the annular flange of the pod is squeezed, for sealing, between the opposite surfaces of the half-shells.

For most appliances, the brewing parameters are fixed and therefore the same for each beverage. Other appliances can have manual settings, but these have to be adjusted by the user for each type of beverage. When a consumable (in particular its type, i.e. which type of food substance is held within the consumable, e.g. whether it is coffee, decaffeinated coffee, coffee distinguished by grind fineness, roast, blend, flavor, etc.) is recognized automatically by the appliance, the settings can be adjusted automatically. This increases the user convenience. Furthermore, the brewing process is correctly adjusted for each consumable type so that the optimal beverage is created.

WO 2013/080073 A1 discloses a package (herein called consumable) for the preparation of beverages. The package comprises an inlet side, through which water enters the package, and an outlet side wherethrough a beverage exits the package. The outlet side of the package is at least partly formed by a liquid-pervious wall, and an apertured film is removably applied to the outlet side of the package.

A sensor is capable of detecting the presence or absence of the tab of the package and therefore can distinguish between a situation in which the apertured film has been removed or maintained on the pod (i.e. the package). If the apertured film has been maintained, depending upon the kind of information provided on the tab and on the kind of sensor used, the machine can be able to collect further information on the kind and nature of the pod.

The information can be used to control the pump of the machine. For example, the pump can be set to provide higher pressure and less flow rate when the apertured film is present and a higher flow rate at a reduced pressure when the apertured film has been removed. In some embodiments the pump 19 can be self-adjusting, i.e. the pump will deliver water at a higher or lower pressure depending upon the counter-pressure generated along the flow path extending from the pump to the exit of the beverage delivery spout. The presence of the apertured film increases drastically the head loss along the flow path, i.e. increases the counter-pressure. If the apertured film is present, the pump will therefore provide a reduced water flow rate at a higher pressure. The beverage will be brewed at a higher pressure and reduced flow rate. If the apertured film is removed, the pump will automatically adjust to work in a different point of the characteristic head-flow rate curve delivering a higher amount of water per unit of time at a lower pressure.

US 2005/183578 A1 discloses a beverage system for selectively delivering, in a same coffee extraction device, short coffee liquid extracts and long coffee liquid extracts comprising: cartridges containing ground coffee; a receiving device for receiving one cartridge at a time and pumping means or injecting water under pressure in the cartridge; means for opening the cartridge wherein these means comprises retaining means to retain the liquid under pressure in the cartridge and engaging means which engage the retaining means to open the cartridge and deliver the coffee liquid extract; wherein the system comprises at least a first cartridge adapted to deliver a short coffee liquid extract, wherein the system comprises at least a second cartridge which has substantially the same external configuration and shape as the first cartridge so as to be capable of being received in the same receiving device as the first cartridge and which is adapted to deliver a longer coffee liquid extract upon allowing a larger amount of water to flow there trough, wherein the second cartridge for the longer coffee liquid extract is configured so that water flows through it at a higher rate than in the first cartridge during extraction.

DE 20 2006 014 317 U1 discloses a coffee maker having a brew unit connected to a heat water inlet and with a brew chamber receiving grinding coffee powder during percolation process of grinding coffee powder. A crema valve is actuated in a coffee outlet line. A pump discharges heat water that is supplied to the brew unit. An output of the pump is provided for preparing an espresso coffee. A flow rate measuring device measures counter pressure counteracting the heat water supplied to the brew chamber by the coffee powder present in the chamber.

WO 2005/053485 A1 discloses a beverage making device comprising a brewing chamber for enclosing one or more pads containing a substance from which the beverage is to be brewed, means for supplying water to said brewing chamber, and means for conducting the brewed beverage from the brewing chamber. Furthermore, there are means for squeezing the pad after the brewing process has been finished but before the brewing chamber is opened to remove the pad.

SUMMARY OF THE INVENTION

It is an object of the present invention to provide a set of consumables comprising at least two consumables for use in a beverage dispenser for preparation of a beverage, which consumables enable recognizing the type of consumable in a simple, foolproof and easily implementable way by a corresponding beverage dispenser. It is a further object of the present invention to provide a corresponding beverage dispenser and a corresponding beverage preparation system for preparation of a beverage.

In a first aspect of the present invention a set of consumables is presented comprising at least two consumables for use in a beverage dispenser for preparation of a beverage, each consumable comprising:

a filtering body defining a space containing a food substance, from which the beverage is obtained by use of liquid, and a recognition element representing a surface of the filtering body facing a plurality of nozzles of the beverage dispenser for recognizing the type of consumable, said plurality of nozzles being provided for providing a flow of liquid through the consumable, wherein the recognition element has a mechanical property, which is recognizable and/or interpretable by the beverage dispenser by obtaining a sensor signal by sensing a flow characteristic of the flow of liquid, when the flow of liquid through the consumable is started by the plurality of nozzles, wherein said mechanical property is different for each type of consumable of the set of consumables so that a characteristic of said sensor signal depends on the mechanical property of the recognition element, wherein the recognition element comprises a plurality of recognition sub-elements, each facing a predetermined number of the plurality of nozzles, and wherein the mechanical properties of at least one recognition sub-element is different for each type of consumable of the set of consumables.

In a further aspect of the present invention a beverage dispenser is presented comprising:

a chamber for receiving the consumable and for the passage of liquid through the consumable, a plurality of nozzles for providing a flow of liquid through the consumable, a sensor for obtaining a sensor signal by sensing a flow characteristic of the flow of liquid, when the flow of liquid through the consumable is started by the plurality of nozzles, wherein said sensor signal depends on a mechanical property of a recognition element representing a surface of the filtering body of the consumable facing the plurality of nozzles, wherein said mechanical property is different for each type of consumable of a set of consumables, a signal processor for recognizing the type of consumable based on said sensor signal, a nozzle controller for controlling said plurality of nozzles to provide a desired flow of liquid through the consumable for the preparation of the beverage by mechanically exerting a force or pressure onto the recognition element, and a beverage controller for controlling one or more parameters of the beverage dispenser according to the recognized type of consumable.

In yet a further aspect of the present invention a beverage preparation system is presented comprising:

a beverage dispenser as disclosed herein, and a consumable from among a set of consumables as disclosed herein arranged in the chamber of the beverage dispenser.

Preferred embodiments of the invention are defined in the dependent claims. It shall be understood that the beverage dispenser and beverage preparation system have similar and/or identical preferred embodiments as the claimed set of consumables and as defined in the dependent claims.

The present invention is based on the idea that the consumable blocks the fluid flow (partially or fully, temporarily or permanently) and that the flow blockage is sensed by the beverage dispenser as such that this information is then used to adjust the beverage preparation process. This measurement may preferably be done via pressure measurement, via flow measurement and/or via changes in flow and/or pressure in time, which may all be understood as a measurement of the flow characteristic. Measurements might be done per channel (i.e. per nozzle), but also for all channels together.

Commonly the fluid flow is enabled through a nozzle. The present invention provides several embodiments for the recognition of a consumable with the use of nozzle blocking agents on top of the consumable, more generally with a mechanical property, which is recognizable and/or interpretable by the beverage dispenser, for instance by a consumable recognition system of the beverage dispenser. At the moment the beverage brewing process starts, the fluid (e.g. hot water) is pumped to the top of the consumable. The beverage dispenser contains several nozzles that apply liquid on the consumable. During the first brewing stage, also called the pre-wetting stage, a small amount of liquid is pumped to the consumable. At the moment the water reaches the consumable, the flow might be stopped on one or more nozzles. This is e.g. measured by the sensor since the liquid pressure will increase. Another possibility is that the water flow as a whole or per nozzle channel is measured and/or this change in flow may be measured by the change in pressure and/or flow in time. Generally, a flow characteristic of the flow of liquid is sensed. The number of nozzles that are partially or completely blocked is indicative for the level of difference in flow. Various nozzles might be different in shape as such that water throughput in not necessarily the same for each of them. The readout of the change in flow or pressure is indicative for a specific consumable type, which makes it possible to discern/recognize the consumable from among a set of consumables comprising different types.

In this context, distinguishing the type of consumable does not only mean to distinguish if the consumable is a capsule or a pad (or pod), but mainly means to distinguish the type of food substance contained (e.g. whether it is coffee, decaffeinated coffee, coffee distinguished by grind fineness, roast, blend, flavor, etc.) and/or the quantity of substance. Based on the recognized type, the beverage dispenser, possibly in combination with commands selected by the user, sets the correct process parameters, such as for example the temperature of the water, the quantity of water to be used, the pressure and/or the speed of the water supply, the infusion time, etc. For instance, if the type of consumable is recognized the kinds of beverages that may (preferably) be prepared may be shown on a display to the user for user selection.

It should be noted that information obtained via the recognition element of the consumable may also concern other aspects, which are not linked to the preparation of the beverage, such as for example statistics. For example, the beverage dispenser may memorize the number of different types of consumables used, or other data which may be useful for managing machine maintenance, or orders for new consumables based on actual consumption, etc.

Contrary to the consumable and the beverage dispenser disclosed in WO 2013/080073 A1, the types of consumables presented according to the present invention are all different without user interaction as required according to WO 2013/080073 A1 according to which the user has to remove an apertured film if he—actively—wants the machine to work in a different point of characteristic head-flow rate curve. In contrast, according to the present invention, the types of consumables distinguish by themselves and no user action is necessary to make them distinguishable and to automatically adjust any parameter(s) of the beverage preparation process.

Further, according to the present invention the recognition element of the consumable is facing the nozzles of the beverage dispenser whereas according to WO 2013/080073 A1 the apertured film is provided on the bottom layer of the consumable facing away from the nozzles. Still further, removing or not removing of the apertured film just allows to distinguish to different states, whereas the present invention allows distinguishing a plurality of consumables.

The recognition element comprises a plurality of recognition sub-elements, each facing a predetermined number of the plurality of nozzles, in particular each facing a single nozzle, wherein the mechanical properties of at least one recognition sub-element is different for each type of consumable of the set of consumables. In this way, the initial resistance to the flow of liquid can be easily controlled by selecting the number of sub-elements that can resist the initial flow (i.e. that are able to prevent liquid from flowing through them in the initial stage, e.g. due to a use of a thicker and/or less liquid permissive material) and the number of sub-elements that cannot resist the initial flow (i.e. that are not able to prevent liquid from flowing through them in the initial stage, e.g. due to a use of a thinner and/or liquid permissive material). The larger the number of sub-elements that resist the initial flow, the lower the total initial flow which can be measured and used to distinguish different types of consumables.

In a preferred embodiment of the set of consumables the recognition element is a cover of the consumable and the mechanical property of the recognition element is one or more of the thickness, size, material, mass, density, compliance, resistance, transmittance, reflectivity. These options provide easy and inexpensive ways to make the consumables distinguishable.

In another embodiment of the set of consumables the mechanical property of the recognition element is configured to allow the desired flow of liquid through the consumable after the sensor signal has been obtained. Hence, for a certain time and/or up to a certain pressure (of the liquid or the nozzle) the desired flow (for preparation of the beverage) is not exerted. In particular, as proposed according to another embodiment, the desired flow of liquid through the consumable is obtained by a mechanical force exerted by an increased flow and/or pressure of liquid or by a mechanical pressure exerted by the plurality of nozzles or by an automatic change of the mechanical property caused by wetting of the consumable.

For instance, in an embodiment the at least one recognition sub-element comprises a different material, has a different thickness and/or a different distance to the nozzle that it faces. All these options have an influence on the resistance to the initial flow of liquid and can be easily and cheaply implemented.

In another embodiment the at least one recognition sub-element comprises a material that resists the flow of liquid for a predetermined period of time, after which it allows the flow of the liquid through it, wherein said predetermined time is different for each type of consumable. Such a material may be at least one of soluble gel, aerosol material and/or protein based foam. Thus, after some time the one or more recognition sub-elements lose their resistance to the flow of liquid automatically, e.g. due to a chemical reaction of the material of the recognition sub-elements with the liquid, so that afterwards the "normal" operation of the beverage dispenser and the preparation of the beverage starts automatically with further control by the nozzle controller to increase the flow pass through the recognition sub-elements.

For the recognition of the type of consumable the sensor signal is processed and evaluated. Generally, at least one characteristic of the sensor signal depends on the mechanical property of the consumable by which the different types of consumables distinguish and will allow distinguishing the different types by evaluating said at least one characteristic. Said characteristic of the sensor signal (e.g. a current or voltage signal) or an electrical signal derived from the sensor signal may be the sensor/electrical signal's amplitude and/or phase, potentially as a function of frequency. Hence, in an embodiment, the sensor signal's amplitude at a specific (predetermined) frequency is evaluated to distinguish different types of consumables.

In a preferred embodiment of the beverage dispenser the sensor is configured to sense the flow of liquid, the pressure of liquid and/or changes of the flow of liquid and/or the pressure of liquid over time. These give an indication about the type of consumable as explained above.

Further, in an embodiment the sensor is configured to obtain a sensor signal per nozzle by sensing a flow characteristic of the flow of liquid per nozzle and the signal processor is configured to recognize the type of consumable based on said sensor signals in combination with the information about the respective nozzle. In this way, not only the total flow or pressure can be measured, but it is also possible to sense which nozzles resist the initial flow and which nozzles do not resist the initial flow so that the positions of the respective nozzles that resist the initial flow may further be used as an (additional or sole) indication of the type of consumable. This embodiment, however, requires that the consumable can only be inserted into the respective chamber in the beverage dispenser at a single predetermined position and orientation.

Preferably, the beverage dispenser further comprises an actuator for moving the nozzles in a direction substantially perpendicular to the recognition element of the consumable, wherein the nozzle controller is configured to control operation of the actuator. In this way the nozzles can be brought in contact with the consumable, in particular with a cover facing the nozzles, in order to punch the cover for enabling the desired flow of liquid through the consumable for preparation of the beverage after the type of consumable has been recognized.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1A:
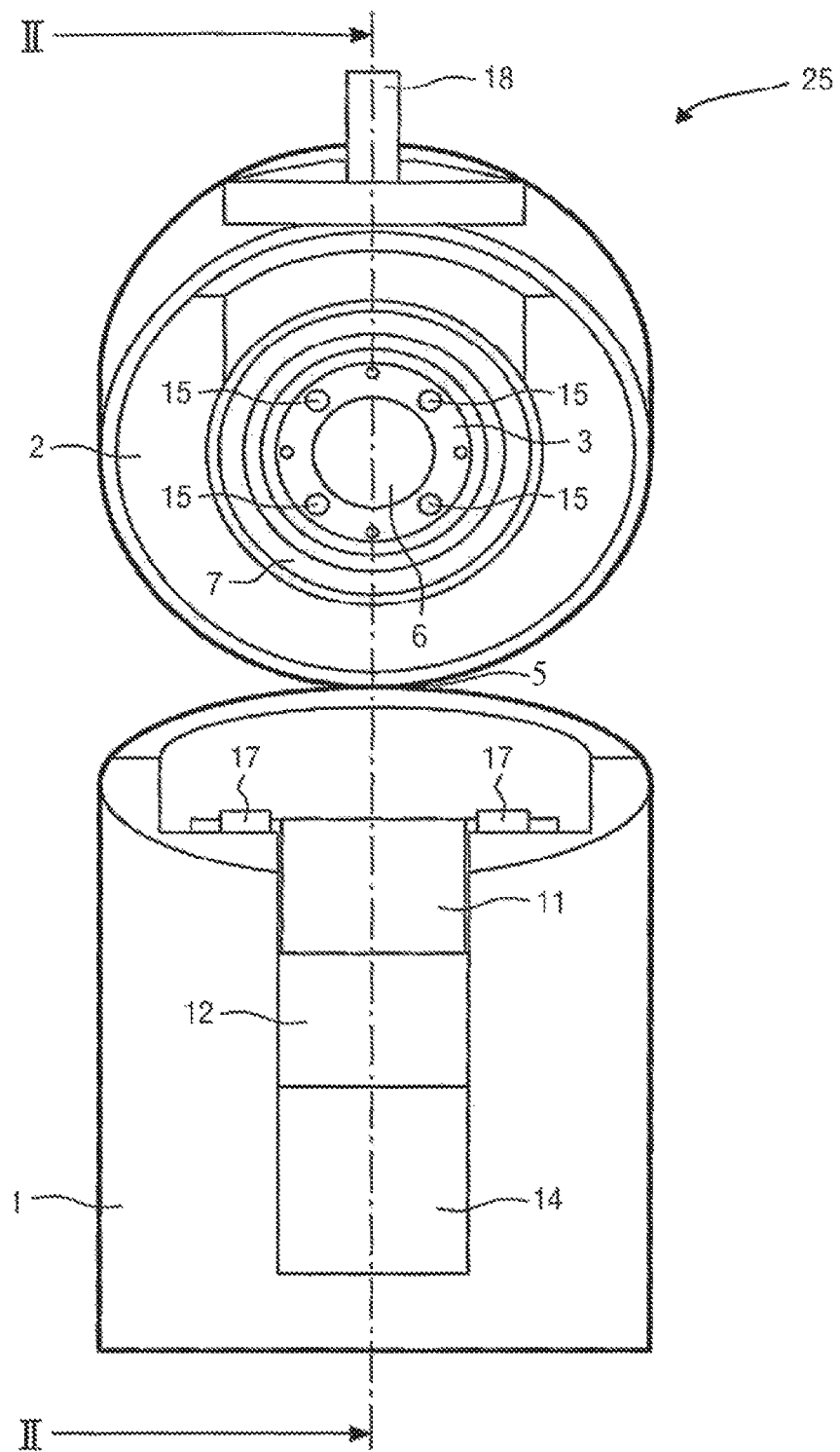
FIG. 1 shows different views of an embodiment of a beverage dispenser according to the present invention.

FIG. 1 shows different views of an embodiment of a beverage dispenser 25 in the form of a coffee making device that generally, together with the consumable 4, forms a beverage preparation system. The coffee making device (i.e. the beverage dispenser 25) uses soft pads as consumables, but it shall be noted here that the invention is neither limited to the use of pads nor limited to coffee making devices. In other embodiments the beverage dispenser is configured to be used for making other beverages than coffee, e.g. tea, hot or cold milk, soup, baby food, etc. Further, pods or capsules may be used as consumables, and the consumables generally contain a corresponding food substance for the preparation of the respective beverage by use of the beverage dispenser.

The coffee making device comprises a stationary part 1 and a hinging part (also called lid) 2. The stationary part 1 comprises the lower wall 8, 9 of the brewing chamber 19 and the hinging part 2 includes the upper wall 3 of the brewing chamber 19. The stationary part 1 furthermore comprises a water container and means for heating the water (or, more generally, an extraction liquid) and pumping a predetermined quantity of the heated water to the brewing chamber 19, which portions of the device are only schematically shown as liquid processing unit 20 for the passage of extraction liquid through the pad 4.

FIG. 1A is a front view of the uppermost portion of the coffee making device showing the stationary part 1 and the hinging part (or lid) 2 of the device. The lid 2 is represented in the open position, i.e. the position in which the brewing chamber 19 is accessible, for example for replacing the pad 4. The upper wall 3 of the brewing chamber is in a substantially vertical position in this case.

Figure 1B:
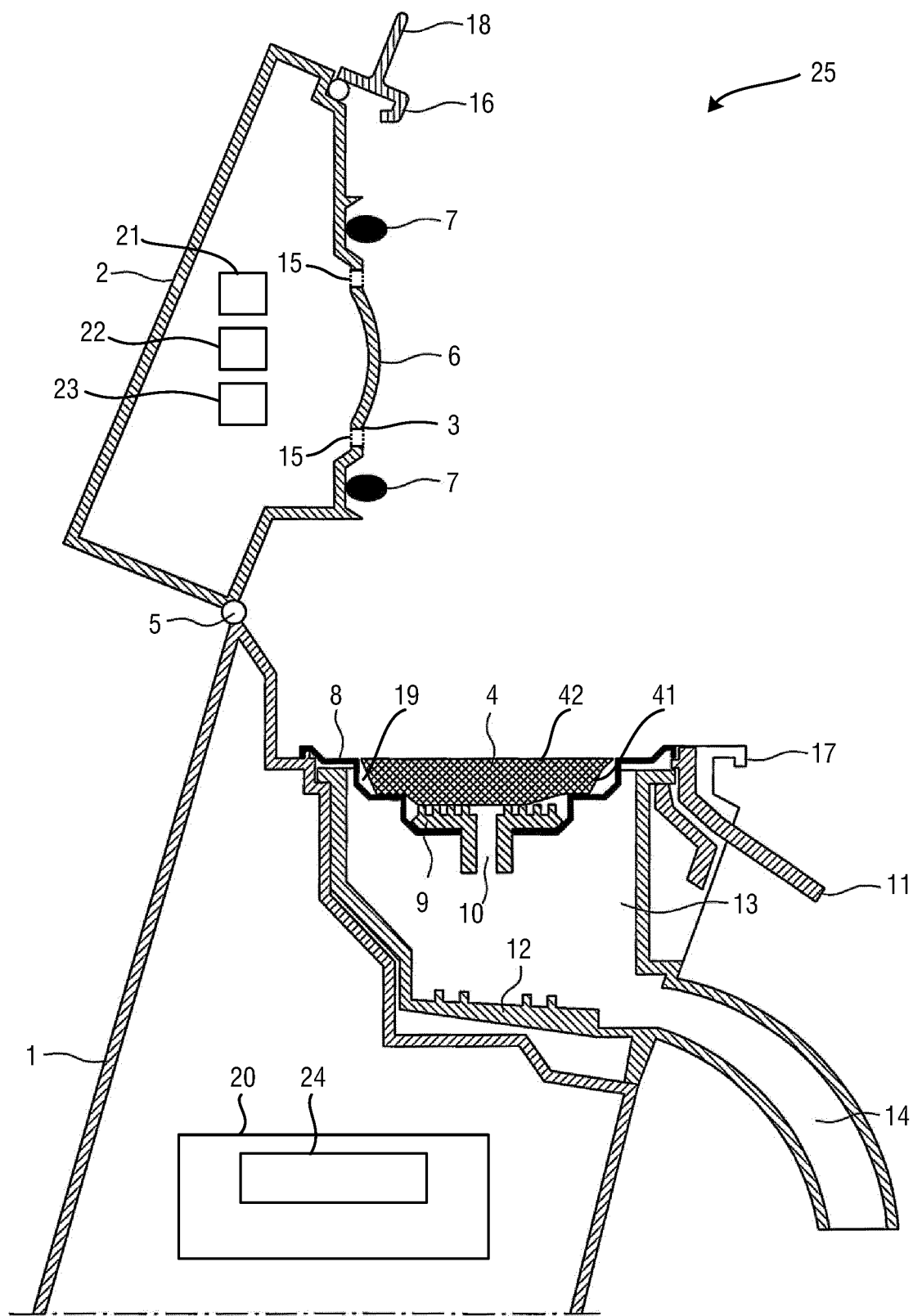
Figure 1C:
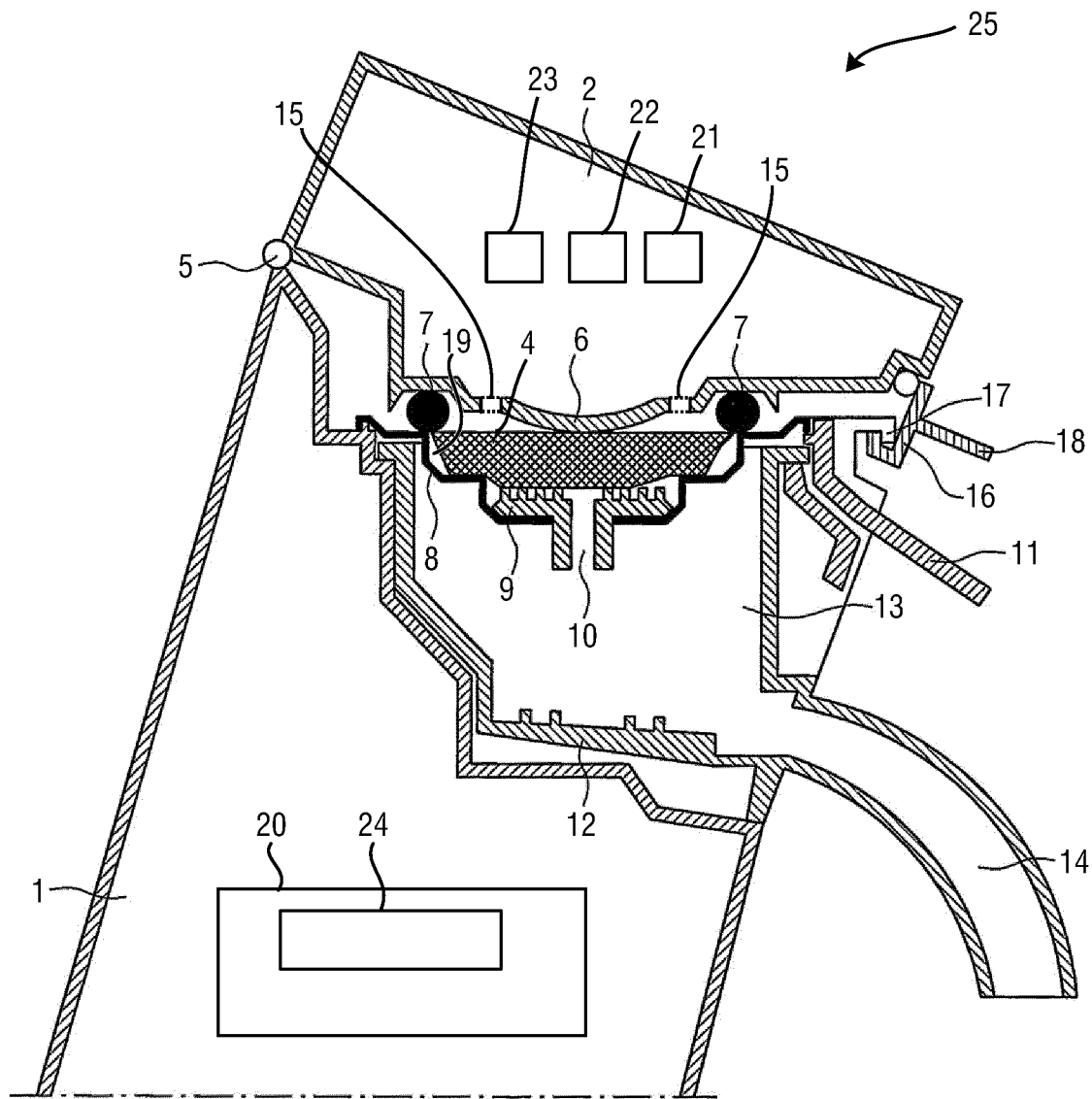

FIGS. 1B and 1C are cross-sectional views with the lid 2 shown in open position (FIG. 1B) and in closed position (FIG. 1C) respectively. The lid 2 hinges about an axis 5, so that it can make a rotating movement. The upper wall 3 of the brewing chamber is provided with a spherical protrusion 6 in its central part, i.e. a dome in the wall 3. A flexible sealing ring 7 is attached to the hinging lid 2 around the upper wall 3.

A first removable part, forming the lower wall of the brewing chamber, is composed of a metal part 8 with attached to it a plastic element 9 having a central outflow opening 10. At its upper side, the plastic element 9 is provided with a number of protrusions to support the pad 4 and to create space for conducting the brewed beverage between the protrusions. The first removable part 8, 9 is designed to contain one pad 4. It can be replaced by a different removable part being designed to contain two pads 4, in which case it encloses more space.

The first removable part 8, 9 is provided with a handle 11 to facilitate its removal from the stationary part 1 of the device. The first removable part 8, 9 can be removed for replacement or cleaning. Below said first removable part 8, 9 there is a second removable part 12, enclosing a beverage collection chamber 13 and provided with a beverage outflow tube 14 that extends outside the stationary part 1 of the device. The brewed beverage, collected in collection chamber 13, leaves the device through outflow tube 14 and can be caught in a cup or the like.

When the lid 2 is closed, sealing ring 7 abuts against the upper wall 3 as well as against said part 8 of the first removable part 8, 9, so that the brewing chamber 19 is closed, except for the nozzles 15 in the upper wall 3 for supplying heated water to the brewing chamber 19, and except for the outflow opening 10. The brewing chamber 19 may enclose a pad 4 as shown in FIG. 1C. Heated water is supplied through the nozzles 15 in the upper wall 3 and passes through the pad 4 to extract coffee. The brewed coffee leaves the brewing chamber through the outflow opening 10. Then the brewed coffee will be collected in the beverage collection chamber 13 and subsequently leave the device through outflow tube 14.

As is shown in FIG. 1C, the lid 2 is kept closed by a hinging latch 16 engaging a downwardly extending edge 17 of the stationary part 1 of the device. The latch 16 can only be released in that the lid 2 is moved in downward direction. The upper wall 3 of the brewing chamber is moved towards the lower part 8, 9 thereby, so that the dome 6 is pressed into the pad 4. This movement squeezes the pad 4, so that excess residue liquid will leave the pad 4 and will leave the brewing chamber through outflow opening 10.

For recognizing the type of pad 4 the beverage dispenser 25 further comprises a (schematically shown) sensor 21 for obtaining a sensor signal by sensing a flow characteristic of the flow of liquid, when the flow of liquid through the consumable is started by the plurality of nozzles 15. The obtained sensor signal depends on a mechanical property of a recognition element 42 of the pad 4. Said recognition element 42 generally represents a surface of the filtering body 41 (also referred to as substance containing body) of the pad 4 facing the plurality of nozzles 15.

The consumable (in this embodiment the pad 4) generally comprises a filtering body 41, which may be hard coated (in case of capsules) or soft shell defining a space containing a food substance, from which the beverage is obtained. Further, the consumable generally comprises a recognition element 42 (also referred to as identifier element) having a mechanical property, which is recognizable and/or interpretable by the beverage dispenser 24 from an obtained sensor signal sensing a flow characteristic of the flow of liquid, when the flow of liquid through the consumable is started by the plurality of nozzles 15. To distinguish the different types of consumables the recognition element 42 has a different mechanical property for each type of consumable of the set of consumables so that said sensor signal depends on the mechanical property of the consumable.

The beverage dispenser 25 further comprises a signal processor 22 for recognizing the type of consumable based on said sensor signal. The signal processor 22 evaluates at least one characteristic of the sensor signal, which depends on the mechanical property of the consumable. For instance, the sensor signal's amplitude and/or phase (and/or the amplitude and/or phase of an electrical signal derived from the sensor signal), potentially as a function of frequency, can be evaluated, preferably in a predetermined frequency range.

A nozzle controller 23 is provided for controlling the plurality of nozzles 15 to provide a desired flow of liquid through the consumable for the preparation of the beverage by mechanically exerting a force or pressure onto the recognition element 42 after the type of consumable has been recognized.

Once the type of consumable has been recognized one or more parameters of the beverage dispenser 25 are controlled by a beverage controller 24, which is preferably provided as part of the liquid processing unit 20, according to the recognized type of consumable. For instance, just to give a simple example, if it is recognized that the consumable contains fine grinded coffee (which is preferably used for making espresso), the liquid is pressed with a higher pressure through the pod than in case the consumable contains regular grinded coffee (as preferably used for making coffee). Parameters that can generally be controlled may be one or more of the temperature of the water, the quantity of water to be used, the pressure and/or the speed of the water supply, the infusion time, flow and cup volume, etc.

The general idea of the recognition of the type of consumable and the control of one or more parameters of the beverage dispenser based on the recognized type of the consumable can also be used in other types of beverage dispensers using e.g. capsules as consumables. Such beverage dispensers are widely known and used. An example of such a beverage dispenser is e.g. described in WO 2012/123440 A1, which also includes a sensing arrangement for detecting an event related to the insertion of a capsule and/or the presence of a capsule as well as the type of capsule in order to automate the preparation of the beverage.

Hence, even if the various embodiments of consumables and ways of recognition of the type of consumable explained in the following refer to a particular type of consumable and, thus, a particular type of beverage dispenser, the respective embodiments shall generally not be understood to be limited only to this type of consumable and/or this type of beverage dispenser.

Next, several embodiments of a consumable according to the present invention and corresponding ways of recognizing the type of consumable will be explained. For the consumable it will be explained how the different types of consumables of a set of consumables containing those different types can be distinguished and how the beverage dispenser is accordingly constructed.

Figure 2A:
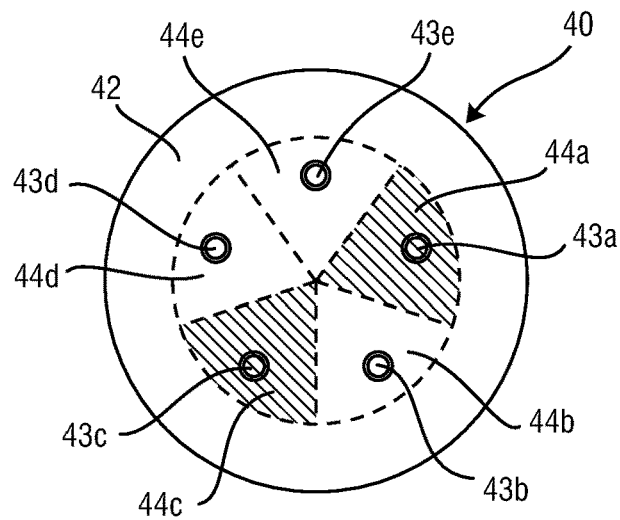
FIG. 2 shows a top view of a first embodiment of a consumable according to the present invention and a perspective view of part of corresponding beverage dispenser.
Figure 2B:
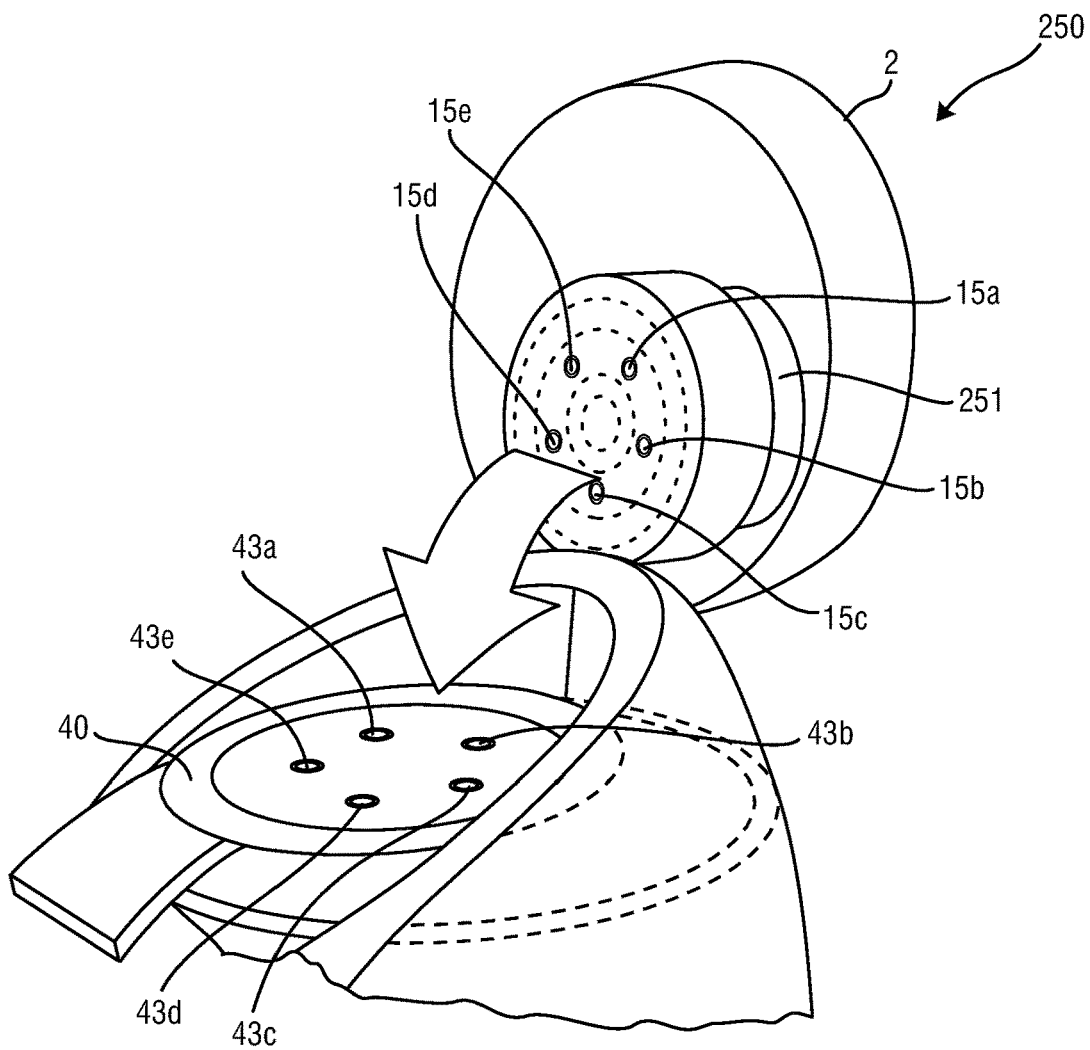

FIG. 2 shows a top view (FIG. 2A) of a first embodiment of a consumable 40 according to the present invention and a perspective view (FIG. 2B) of part of corresponding beverage dispenser 250 into which the consumable 40 has been inserted. In the lid 2 of the beverage dispenser 250 the nozzles 15a-15e (in this example five nozzles) are shown as dots. The corresponding positions 43a-43e on the surface (lid) 42 consumable 40 are also shown as dots, which are each part of a corresponding recognition sub-element 44a-44e. When the lid 2 of the beverage dispenser 250 is closed the nozzles 15 will touch these recognition sub-elements 44a-44e at the positions 43a-43e on the consumable 40.

As indicated in FIG. 2A two of the five recognition sub-elements 44a, 44c differ from the other three recognition sub-elements 44b, 44d, 44e. For instance, when the flow of liquid is started after insertion of a consumable, the recognition sub-elements 44a, 44c may be configured such that they block the respective nozzles 15a, 15c so that no liquid can flow through the consumable, while the other recognition sub-elements 44b, 44d, 44e are configured such that they do not block the respective nozzles 15b, 15d, 15e so that liquid can flow through the consumable. This will result in a specific (total) liquid flow and a specific pressure increase, either or both of which can be measured by the sensor (e.g. a pressure sensor or a flow meter). Said measurement indicates the type of consumable since other types of consumables have less or more recognition sub-elements that differ from other recognition sub-elements.

In FIG. 2 five equal nozzles 15 are shown. However, this number and the fact that they are equal in size is not fixed. On the consumable 40 also five positions 43a-43e and five recognition sub-elements 44a-44e are drawn. These recognition sub-elements may be small circles or triangles, but might also be segments as shown in FIG. 2A. If segments are used, the positioning of the consumable 40 might be arbitrary. With five equally sized nozzles 15 this means that the total number of different consumables is limited to eight. If the consumable 40 is positioned in a specific orientation the total number of different consumables that might be identified increases to 52. Another way to increase the total number of consumables to be identified is the use of nozzles with various dimensions in one beverage dispenser and or to provide that some or all recognition sub-elements do not only have two different states (i.e. completely open or completely blocking), but three or more states (e.g. completely open, half open or completely blocking).

By closing the lid 2 of the beverage dispenser 250 the nozzles 15 are positioned for the pre-wetting phase. During this short period of time the pressure increase is measured, which indicates the type of consumable 40. Right after that, the nozzles 15 are pushed a bit further down, e.g. by a corresponding actuator 251. Due to this action, the nozzles 15 that were blocked previously will be open for the actual brewing phase.

The described mechanical properties of the various recognition sub-elements are preferably achieved by using different materials for the different recognition sub-elements, but in other embodiments a thicker cover material, more pressed food substance (e.g. beverage grind), size, material, mass, density, compliance and/or resistance. By using the same materials that are currently already used for known consumables, the consumable stays as biodegradable as before.

Another possibility for opening the blocked nozzles is that the force of the liquid flow during the pre-wetting phase is much lower compared with the final flow. During pre-wetting some of the nozzles will be blocked, and as such will indicate the type of consumable. Afterwards, a much higher pressure created by the final flow will open all the nozzles.

Figure 3:
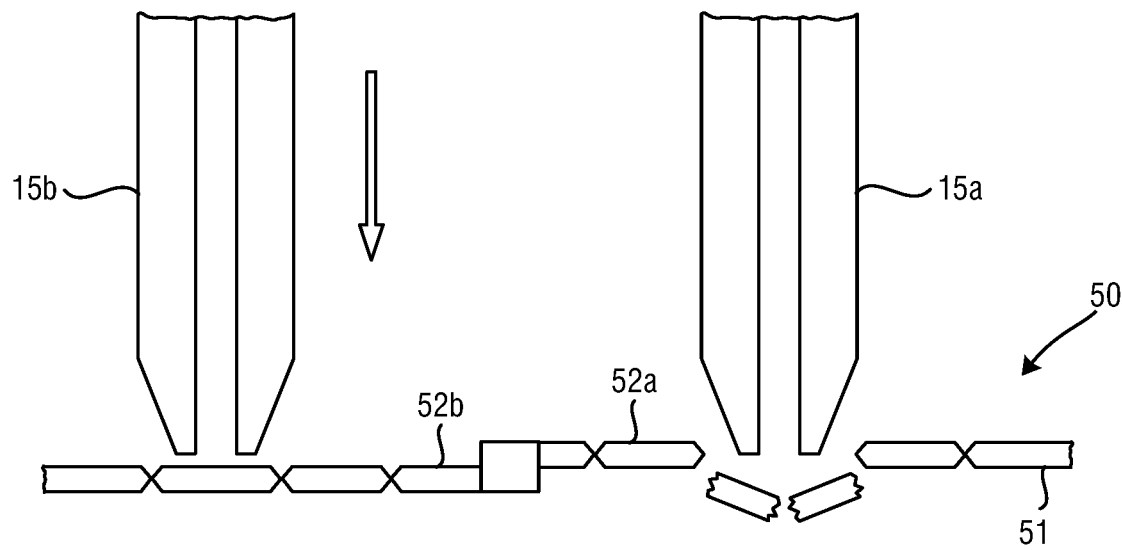
FIG. 3 shows a cross-sectional view of a second embodiment of a consumable according to the present invention.

FIG. 3 shows a cross-sectional view of a second embodiment of a consumable 50 according to the present invention, wherein substantially the cover 51 of the consumable 50 is shown. According to this embodiment, in addition to a specific material type, the recognition element (also called nozzle blocking agent) is provided by a cover 51 (which may also be a thin/soft filter material) that is elevated in certain segments (i.e. recognition sub-elements). As shown in FIG. 3 the recognition sub-element 52a is elevated, i.e. has a smaller distance to the respective nozzle 15a, than the recognition sub-element 52b, which has a larger distance to the respective nozzle 15b. In the initial position of the nozzles (also called pre-wetting phase), which is shown in FIG. 3, the nozzle 15a has come in contact with the recognition sub-element 52a and has opened (destroyed) it so that the fluid can flow through this segment. In contrast, the nozzle 15b is still spaced apart from the recognition sub-element 52b, so that the (undestroyed) recognition sub-element 52b blocks the fluid flow through this segment. In the subsequent beverage preparation phase the nozzles 15 are moved downwards (i.e. in the direction of the consumable 50) so that all recognition sub-elements including the recognition sub-element 52b are opened to allow fluid flow through all recognition sub-elements.

Figure 4:
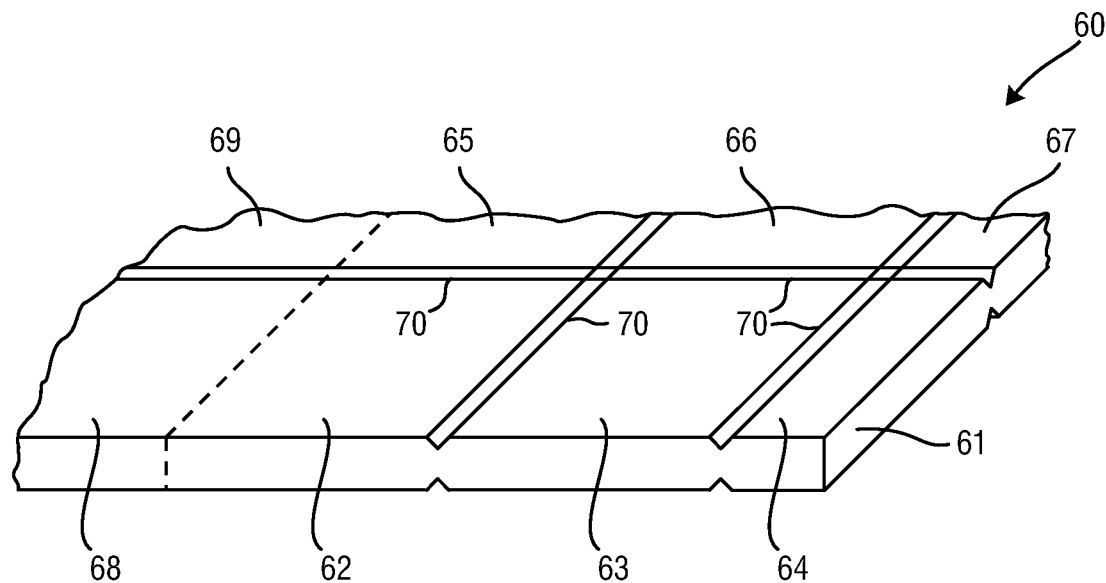
FIG. 4 shows a perspective view of a third embodiment of a consumable according to the present invention.

The blocking of the nozzles might also be done with material that resists the pressure of the extraction liquid, e.g. hot water, only for a very short period of time. For instance, material that is soluble in hot water or loses its rigid properties due to the presence of hot water may be used. It might also be possible to have the hot water soluble material in the form of a network, with beverage grind inside. This is illustrated in FIG. 4 showing a perspective view of a third embodiment of a consumable 60 according to the present invention, wherein substantially the cover 61 of the consumable 60 is shown. As shown, between different segments 62, 63, 64, 65, 66, 67 the cover 61 is made thinner as a kind of grooves 70 to weaken the material there so that the recognition sub-elements 63, 64, 66, 67 are broken off in response to initial flow of fluid, whereas other recognition sub-elements 63, 65, 68, 69, which are not separated by grooves, will block the initial flow of fluid and may only be destroyed or broken off by a higher pressure or a mechanical force.

Besides other materials the different mechanical properties of different recognition sub-element may be achieved by beverage grind that is pressed in the filter material (i.e. into the cover) and thus blocks the nozzle for some time, whereas in other recognition sub-elements no grind is pressed into the filter material (i.e. into the cover).

The blocking of the nozzles may also be created with material that resists the liquid pressure only for a very short period of time. For instance, material that chemically reacts with hot water to a liquid or to a water soluble material may be used in some recognition sub-elements in another embodiment.

This means that the material used will become part of the beverage. This might be kept to a very little amount by only using a small edge of a recognition sub-element. Depending on the type and amount of material used, the consumable might stay biodegradable still. In this embodiment hot water soluble gels, aerosol materials or protein based foam materials are preferably used.

In summary, according to the present invention a plurality of different types of consumables can be accurately and reliably distinguished in an easy manner. The initial resistance to the flow of liquid, i.e. when the flow of liquid is started at which moment the recognition shall quickly take place, can be easily controlled and recognized. This can be achieved by selecting the number of sub-elements that can resist the initial flow, i.e. that are able to prevent liquid from flowing through them in the initial stage, e.g. due to the use of a thicker and/or less liquid permissive material, and a number of sub-elements that cannot resist the initial flow, i.e. that are not able to prevent liquid from flowing through them in the initial stage, e.g. due to the use of thinner and/or liquid permissive material. The larger the number of sub-elements that resist the initial flow, the lower the total initial flow which can be measured and used to distinguish different types of consumables. Further, by use of the plurality of nozzles separate signals can be sensed at each nozzle, if desired, which further increases the accuracy and reliability.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A set of consumables comprising at least two consumables for use in a beverage dispenser including a plurality of nozzles and a sensor for obtaining a sensor signal for preparation of a beverage, each consumable of said set comprising:
    a filtering body defining a space containing a food substance, from which the beverage is obtained by use of liquid, and
    a recognition element representing a surface of the filtering body configured to face the plurality of nozzles of the beverage dispenser, said plurality of nozzles being provided for providing a flow of liquid through the consumable, wherein the recognition element has a mechanical property, which is recognizable and/or interpretable by the beverage dispenser when said beverage dispenser obtains said sensor signal by sensing a flow characteristic of the flow of liquid, when the flow of liquid through the consumable is started by the plurality of nozzles, wherein said mechanical property is different for each type of consumable of the set of consumables so that a characteristic of said sensor signal depends on the mechanical property of the recognition element,
    wherein the recognition element comprises a plurality of recognition sub-elements, each facing a predetermined number of the plurality of nozzles, and
    wherein the mechanical properties of at least one recognition sub-element, of the plurality of recognition sub-elements, is different for each type of consumable of the set of consumables.

2. The set of consumables as claimed in claim 1,
    wherein the recognition element is a cover of the consumable, and wherein the mechanical property of the recognition element is one or more of a thickness, size, material, mass, density, compliance, and mechanical resistance.

3. The set of consumables as claimed in claim 1, wherein the mechanical property of the recognition element is configured to allow a desired flow of liquid through the consumable after the sensor signal has been obtained.

4. The set of consumables as claimed in claim 3, wherein the desired flow of liquid through the consumable is obtained by a mechanical force exerted by an increased flow and/or pressure of liquid or by a mechanical pressure exerted by the plurality of nozzles or by an automatic change of the mechanical property caused by wetting of the consumable.

5. The set of consumables as claimed in claim 1, wherein each recognition element is configured to face a single nozzle.

6. The set of consumables as claimed in claim 1, wherein the at least one recognition sub-element comprises a material, has a thickness and/or a distance to a nozzle that it faces, wherein said material, thickness, and/or distance is different for each type of consumable.

7. The set of consumables as claimed in claim 1, wherein the at least one recognition sub-element comprises a material that resists the flow of liquid for a predetermined period of time, after which the material allows the flow of the liquid through the material, wherein said predetermined period of time is different for each type of consumable.

8. The set of consumables as claimed in claim 7, wherein the material is at least one of soluble gel, aerosol material and/or protein based foam.

9. A beverage dispenser for preparation of a beverage by use of a consumable containing a food substance, from which the beverage is obtained by use of liquid, the beverage dispenser comprising:
a chamber configured to receive the consumable and to pass liquid through the consumable,
a plurality of nozzles configured to provide a flow of liquid through the consumable,
a sensor configured to obtain a sensor signal separately from each of the plurality of nozzles by sensing a flow characteristic of the flow of liquid per nozzle, when the flow of liquid through the consumable is started by the plurality of nozzles, wherein said sensor is further configured to produce said separate sensor signals dependent on mechanical properties of recognition elements representing a surface of the consumable facing the plurality of nozzles, wherein at least one of said mechanical properties is different for each type of consumable of a set of consumables,
a signal processor configured to recognize the type of consumable based on said separate sensor signals in combination with information distinguishing each of the respective nozzles,
a nozzle controller configured to control said plurality of nozzles to provide a desired flow of liquid through the consumable for the preparation of the beverage by mechanically exerting a force or pressure onto the recognition elements, and
a beverage controller configured to control one or more parameters of the beverage dispenser according to the recognized type of consumable.

10. The beverage dispenser as claimed in claim 9, wherein the sensor is further configured to sense the flow of liquid, the pressure of liquid and/or changes of the flow of liquid and/or the pressure of liquid over time.

11. The beverage dispenser as claimed in claim 9, further comprising an actuator configured to move the plurality of nozzles in a direction substantially perpendicular to a recognition element, of the recognition elements, of the consumable,
wherein the nozzle controller is further configured to control operation of the actuator.

12. A beverage preparation system for preparation of a beverage by use of a consumable containing a food substance, from which the beverage is obtained by use of liquid, the beverage preparation system comprising:
a chamber configured to receive the consumable and to pass liquid through the consumable,
a plurality of nozzles configured to provide a flow of liquid through the consumable,
a sensor,
a consumable from among a set of consumables configured to be arrangeable in the chamber, said set of consumables comprising at least two consumables for use in the preparation of the beverage, each consumable of said set comprising:
a filtering body defining a space containing a food substance, from which the beverage is obtained by use of liquid, and
a recognition element representing a surface of the filtering body configured to face the plurality of nozzles of a beverage dispenser, said plurality of nozzles being further configured to provide the flow of liquid through the consumable,
wherein the recognition element has a mechanical property, which is recognizable and/or interpretable by the sensor, the sensor being configured to obtain a sensor signal by sensing a flow characteristic of the flow of liquid, when the flow of liquid through the consumable is started by the plurality of nozzles, wherein said mechanical property is different for each type of consumable of the set of consumables so that a characteristic of said sensor signal depends on the mechanical property of the recognition element,
a signal processor configured to recognize the type of consumable based on said sensor signal,
a nozzle controller configured to control said plurality of nozzles to provide a desired flow of liquid through the consumable for the preparation of the beverage by mechanically exerting a force or pressure onto the recognition element, and
a beverage controller configured to control one or more parameters of the beverage preparation system according to the recognized type of consumable.

13. A beverage dispenser for preparation of a beverage by use of a consumable containing a food substance, from which the beverage is obtained by use of liquid, the beverage dispenser comprising:
a chamber configured to receive the consumable and to pass liquid through the consumable,
a plurality of nozzles configured to provide a flow of liquid through the consumable,
a sensor configured to obtain a sensor signal by sensing a flow characteristic of the flow of liquid, when the flow of liquid through the consumable is started by the plurality of nozzles, wherein said sensor is further configured to produce said sensor signal dependent on a mechanical property of at least one recognition element representing a surface of the consumable facing the plurality of nozzles, wherein said mechanical property is different for each type of consumable of a set of consumables,
a signal processor configured to recognize the type of consumable based on said sensor signal,
a nozzle controller configured to control said plurality of nozzles to provide a desired flow of liquid through the consumable for the preparation of the beverage by mechanically exerting a force or pressure onto the at least one recognition element,
a beverage controller configured to control one or more parameters of the beverage dispenser according to the recognized type of consumable, and
an actuator configured to move the plurality of nozzles in a direction substantially perpendicular to the at least one recognition element of the consumable,
wherein the nozzle controller is further configured to control operation of the actuator.

* * * * *